Figure 1:
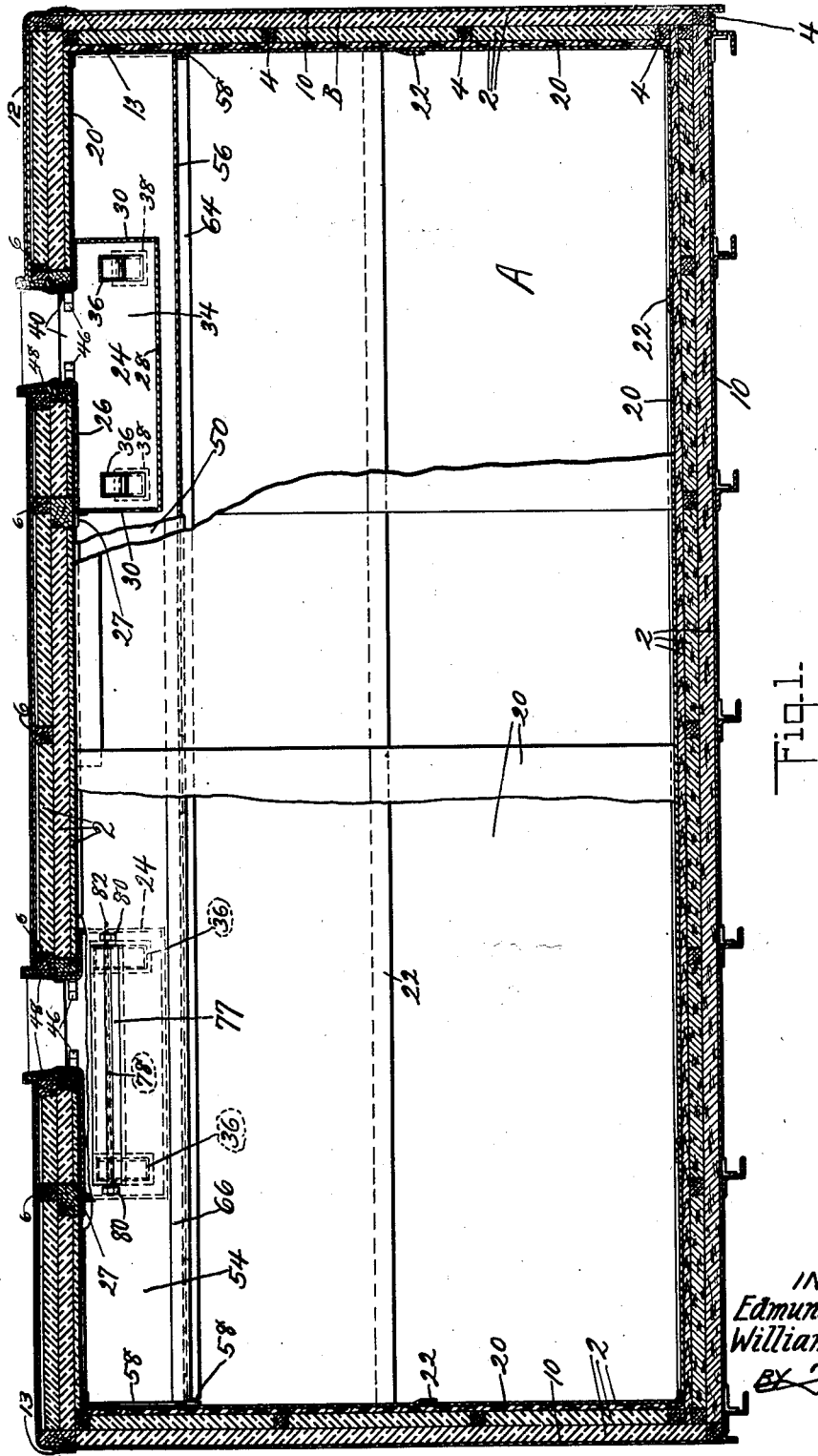

Dec. 5, 1933.  E. F. GOODYEAR ET AL  1,937,563
WHEEL BRAKE
Filed Aug. 18, 1932
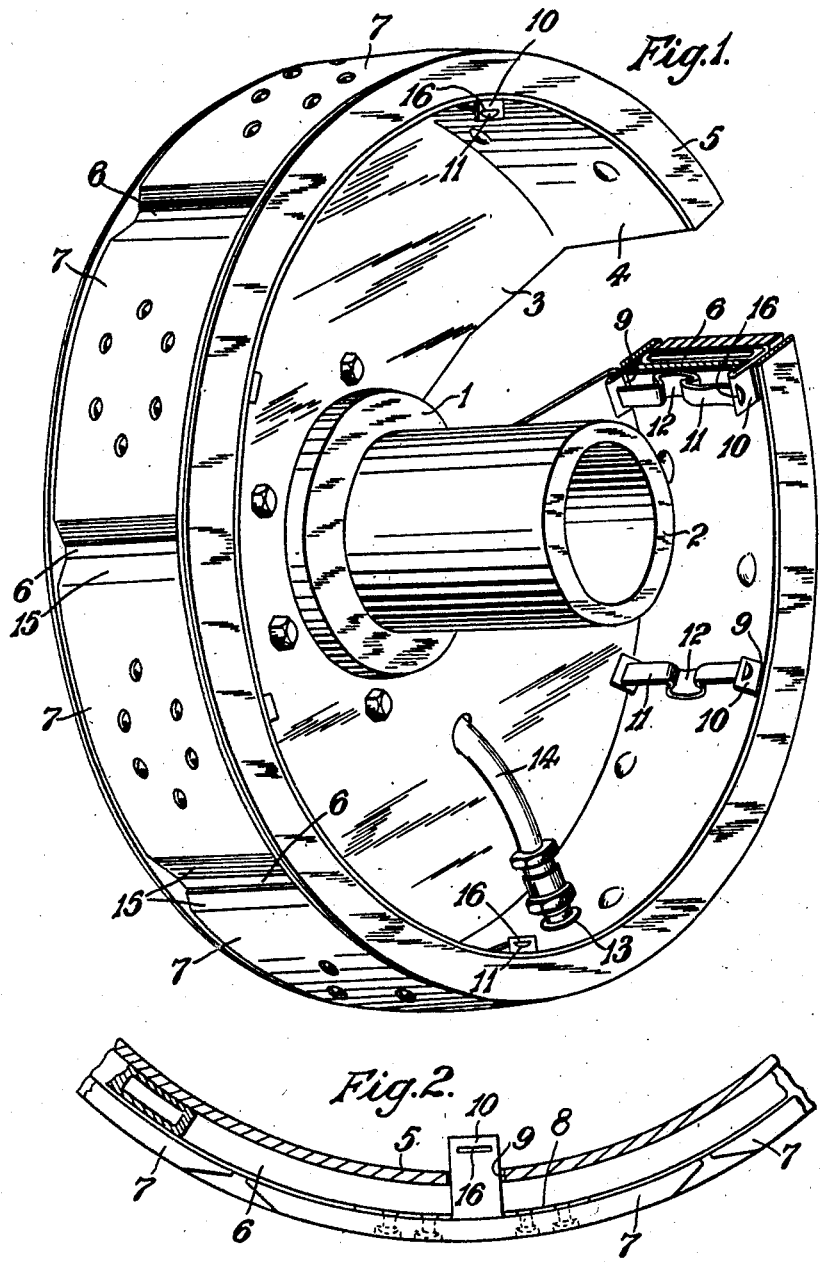
INVENTORS
Ernest Frederick Goodyear
Joseph Wright
by Elwin & Pauler
their attorneys.

Dec. 5, 1933. E. D. CAMPBELL ET AL 1,937,545

REFRIGERATOR

Filed May 23, 1930 3 Sheets-Sheet 1

INVENTORS
Edmund D.Campbell
William F.Dietrichson
BY J.H.Gibbs
ATTORNEY

Patented Dec. 5, 1933

1,937,563

UNITED STATES PATENT OFFICE

1,937,563

WHEEL BRAKE

Ernest Frederick Goodyear, Moxhall Park, Wishaw, and Joseph Wright, Stoke Park, Coventry, England, assignors to Dunlop Rubber Company Limited, London, England, a British company Application August 18, 1932, Serial No. 629,260, and in Great Britain September 16, 1931

8 Claims. (Cl. 188—152)

This invention concerns improvements in or relating to brakes for vehicle wheels and more particularly concerns brakes for aeroplane wheels, of the kind which are applied by fluid pressure and released by spring pressure.

An object of the invention is to provide simple, effective and lightweight means whereby the brakes will be released by spring pressure acting positively to withdraw each brake shoe on release of the fluid pressure, and in which the parts may be easily inspected and dismounted whereby, upon removing the brake drum of the wheel, all of the shoe detaching members and associated spring mechanism are exposed for detachment of any one or all of the shoes or of the fluid pressure means.

Other objects of the invention are to so locate the spring elements within the inner circumference of the fluid pressure means as to permit the use of a fluid pressure means of maximum diameter and of large cubic content, and in which the radius at which the fluid pressure acts is a maximum.

Other features and objects of the invention are to provide a spring loaded attachment of the brake shoes transversely of their mid portions so as to permit a slight fore and aft movement or rocking by each shoe in self adjustment to temporary differences in frictional effort between the brake surfaces.

According to this invention we provide brake mechanisms for vehicle wheels comprising a distensible annulus held in compression against the outer side of a circular support by a plurality of brake shoes, connected to exposed springs bearing against the under surface of the support, preferably in which each shoe is positioned in relation to the support for the distensible annulus by a member having extensions passing through slots in the support, and in which the springs are held transversely across the inner surface of the support, and are detachably engaged by the slots in the shoe carrying member, being positioned transversely across the central portion of each shoe, the ends of which are preferably of tapered cross section.

In order that the invention may be more easily understood and readily carried into effect, the invention will now be described with reference to the accompanying drawing, in which Fig. 1 is a part perspective view of the invention;

Fig. 2 is a part sectional, part outside view;

To a collar 1 on the stub axle 2 is secured a web or disc 3, peripherally flanged at 4, the peripheral flange supporting a circular U-shaped trough 5 which positions the inflatable annulus 6.

The U-shaped trough 5 may be formed by bending up the outer edge of the flange 4 and at the opposite edge of the flange adding an annular flat ring, either by welding or otherwise securing it to the web or flange 4, or a separate trough may be mounted on the flange 4.

The outer surface of the inflatable annulus 6 supports a number of independent brake shoes 7 of suitable material, each of these shoes being centrally carried in segmental lightweight metal members 8, Fig. 2, which are provided with integral toe-pieces 10 which pass radially through circumferential slots 9 in the circular U-shaped trough.

The inner ends of these toe-pieces 10 are slotted at 16 and through the slots are passed spring members 11, each of which is formed with two lateral flat portions and a central elliptical portion 12, the convex portion of which engages the base or under surface of the flange 4 formed on the disc to support the circular trough.

Each shoe 7 and end 15 is preferably tapered as shown so that uneven edge action is obviated. The flange 4 and annulus 5 are perforated at 13 to pass a pipe 14 by which the fluid pressure is conveyed to the distensible member 6.

When the brakes are to be applied, fluid under pressure is supplied through the pipe 14 to the interior of the annulus 6. This fluid expands or inflates the annulus and as the only direction in which expansion can take place is outwardly, it pushes or presses the brake shoes outwardly against the brake flange of the vehicle. The outward movement of the brake shoes draws outwardly the toe pieces or guiding elements 10 and thereby places the spring members 11 under tension. When the brakes are to be released, pressure fluid is permitted to escape from the annulus 6 through the pipe 14 whereupon the spring elements 11 acting through the guides or toe pieces 10, draw the brake shoes 7 away from the braking surface. Inasmuch as the guides or toe pieces 10 are at the mid portion of the shoes 7, the latter are permitted to rock slightly and adjust themselves to fit the inner surface of the brake drum. There being one guide at each side of the shoes 7, serves to avoid transverse tilting stresses on the shoes.

What we claim is—

1. Brake mechanism for vehicle wheels comprising a circular support, a plurality of brake shoes, a distensible annulus between the outer side of said circular support and said brake shoes, guiding and supporting members extending inwardly from said brake shoes on opposite sides of said annulus and springs bearing against the under surface of the support and reacting on said members to hold said brake shoes against said support.

2. Brake mechanism for vehicle wheels comprising a circular support, a plurality of brake shoes each having members extending from opposite edges of said shoes through slots in said support, a distensible annulus between the outer side of said support and said brake shoes, and springs connected to said extensions and bearing against the under surface of said support.

3. Brake mechanism for vehicle wheels comprising a circular support, a plurality of brake shoes, a distensible annulus between the outer side of said support and said brake shoes, guiding and supporting members extending inwardly from said brake shoes on opposite sides of said annulus and transverse springs connected to said members and bearing between said members against the under surface of said support.

4. Brake mechanism for vehicle wheels comprising a circular support, a plurality of brake shoes, a distensible annulus between said circular support and said brake shoes, said shoes having supporting members extending on opposite sides of said annulus through slots in said circular support, and springs detachably engaged by said supporting members and bearing against said circular support.

5. Brake mechanism for vehicle wheels comprising a circular support, a plurality of brake shoes, each shoe having supporting members extending through said circular support on opposite sides of said shoes at the midway of the ends thereof, a distensible annulus between said circular support and said brake shoes, and springs positioned transversely of and bearing against said central support and secured to said brake shoe support.

6. The mechanism of claim 1 in which the ends of the brake shoes are tapered in cross section.

7. Brake mechanism for vehicle wheels which comprises an annular outwardly open supporting trough a number of individual brake shoes in said trough and having extensions through the inner wall thereof a distensible annulus in said trough between the inner wall thereof and said brake shoes, and resilient means engaged between the inner wall of said trough and said brake shoe extensions to hold said brake shoes against said distensible member.

8. The mechanism of claim 7 and a disc and in which said annular trough forms a flange on the periphery of said disc.

ERNEST FREDERICK GOODYEAR.
JOSEPH WRIGHT.